United States Patent
Tart et al.

(10) Patent No.: US 7,225,063 B2
(45) Date of Patent: May 29, 2007

(54) AIRCRAFT CONTROL SYSTEM

(75) Inventors: Keith Raymond Tart, Sutton Coldfield (GB); Matthew Emmerson Allen, Leamington Spa (GB)

(73) Assignee: Keith R Tart, Sutton Coldfield (GB)

( * ) Notice: Subject to any disclaimer, the term of this patent is extended or adjusted under 35 U.S.C. 154(b) by 363 days.

(21) Appl. No.: 10/247,974

(22) Filed: Sep. 20, 2002

(65) Prior Publication Data

US 2003/0055564 A1 Mar. 20, 2003

(30) Foreign Application Priority Data

Sep. 20, 2001 (GB) ................. 0122678.6
Jul. 4, 2002 (GB) ................. 0215426.8

(51) Int. Cl.
*G05D 1/12* (2006.01)
*G05D 1/08* (2006.01)

(52) U.S. Cl. ............................ 701/4; 701/11; 701/13; 701/206; 701/207; 701/301; 348/117

(58) Field of Classification Search ............... 701/301, 701/302, 200, 201, 202, 205, 206, 207, 209, 701/210, 211, 213, 224, 225, 1, 4, 3, 2, 7, 701/9, 11, 14, 16, 23, 24, 26, 35, 36, 13; 244/3.1, 3.11, 3.15, 3.21, 75 R, 76 R, 220, 244/221; 340/901, 902, 903, 945, 951, 963, 340/967, 979, 988, 995.13, 995.21, 995.23, 340/500, 524, 541; 348/117

See application file for complete search history.

(56) References Cited

U.S. PATENT DOCUMENTS

| | | | |
|---|---|---|---|
| 3,801,979 A * | 4/1974 | Chisholm | 342/31 |
| 4,359,733 A * | 11/1982 | O'Neill | 342/36 |
| 4,835,537 A * | 5/1989 | Manion | 342/30 |
| 5,414,631 A | 5/1995 | Denoize et al. | |
| 5,488,563 A | 1/1996 | Chazelle et al. | |
| 5,493,497 A * | 2/1996 | Buus | 701/4 |
| 5,677,842 A * | 10/1997 | Denoize et al. | 701/301 |
| 5,751,245 A * | 5/1998 | Janky et al. | 342/357.07 |
| 5,867,804 A | 2/1999 | Pilley et al. | |
| 5,872,526 A | 2/1999 | Tognazzini et al. | |

(Continued)

FOREIGN PATENT DOCUMENTS

EP 1121678 B1 * 6/2004

(Continued)

OTHER PUBLICATIONS

Unknown, Honeywell's Differential GPS Satellite Landing System, from Sep. 1996 issue of Avionics News Magazine.*

(Continued)

*Primary Examiner*—Cuong Nguyen

(57) ABSTRACT

A flight control system for preventing an aircraft colliding with designated man-made structures in which the geographical position of the aircraft is determined and then compared with predetermined geographical boundaries that represent excluded zones; these zones being defined around the man-made structures; where the system, as appropriate, overrides a normal flight control system (such as a fly-by-wire flight system) to alter the course of the aircraft to avoid all excluded zones, irrespective of any pilot commands.

17 Claims, 2 Drawing Sheets

U.S. PATENT DOCUMENTS

| | | | |
|---|---|---|---|
| 5,951,607 A * | 9/1999 | Senn et al. | 701/1 |
| 6,173,219 B1 * | 1/2001 | Deker | 701/3 |
| 6,201,482 B1 | 3/2001 | Schiefele et al. | |
| 6,218,961 B1 * | 4/2001 | Gross et al. | 340/903 |
| 6,219,618 B1 | 4/2001 | Bateman et al. | |
| 6,259,976 B1 | 7/2001 | Lemelson et al. | |
| 6,298,286 B1 * | 10/2001 | Ying | 701/4 |
| 6,314,366 B1 | 11/2001 | Farmakis et al. | |
| 6,317,663 B1 | 11/2001 | Meunier et al. | |
| 6,363,323 B1 * | 3/2002 | Jones | 701/213 |
| 6,377,892 B1 * | 4/2002 | Johnson et al. | 701/213 |
| 6,486,801 B1 * | 11/2002 | Jones | 340/994 |
| 6,600,992 B2 * | 7/2003 | Dow | 701/207 |
| 6,641,087 B1 * | 11/2003 | Nelson | 244/118.5 |
| 6,643,580 B1 * | 11/2003 | Naimer et al. | 701/206 |
| 6,675,095 B1 * | 1/2004 | Bird et al. | 701/301 |
| 6,750,788 B2 * | 6/2004 | Block | 340/963 |
| 2003/0050745 A1 * | 3/2003 | Orton | 701/3 |
| 2003/0055540 A1 * | 3/2003 | Hansen | |
| 2003/0128122 A1 * | 7/2003 | Reynolds | 340/573.1 |
| 2003/0139858 A1 * | 7/2003 | Koncelik | 701/2 |
| 2003/0152145 A1 * | 8/2003 | Kawakita | 375/240.12 |
| 2003/0169185 A1 * | 9/2003 | Taylor | 340/945 |
| 2003/0193404 A1 * | 10/2003 | Joao | 340/825.71 |

FOREIGN PATENT DOCUMENTS

| | | | |
|---|---|---|---|
| GB | 1398493 A | * | 12/1973 |
| WO | WO 8201076 A | * | 4/1982 |

OTHER PUBLICATIONS

Unknown, Automatic landing system, Jun. 1995, total of pages are 479 from http://atrs.arc.nasa.gov/atrs/95/kaufmann/950066/950066.refer.new.html.*

* cited by examiner

AIRCRAFT CONTROL SYSTEM

BACKGROUND OF INVENTION

1. Field of the Invention

This invention relates to a control system for preventing an aircraft colliding with designated man-made structures.

2. Description of the Related Art

It is widely appreciated that aircraft, particularly civil passenger aircraft, are at risk of being commandeered by unauthorised people. Recent events have shown that aircraft pilots can be overpowered and unauthorised people can fly civil aircraft into buildings with great loss of life.

A flight control system is known. U.S. Pat. No. 5,488,563 (Chazelle et al.), which compares the position of an aircraft as determined by a Global Positioning System (GPS) or the like with a detailed map of the terrain over which the aircraft is expected to fly. With this information the system can alert a pilot if the aircraft appears to be on a ground collision course. However, this type of system requires a very large database detailing all topographical data proximal the flight-path, much of which is irrelevant. Such systems do not address the situation where an aircraft legitimately needs to fly near man-made structures such as buildings; for example, during landing at an airport.

Aircraft flight controls systems, such as autopilots, are many and well known; they shall not be described here to maintain conciseness. The applicant refers the reader to many publications in the name of Boeing $^{RTM}$ and others; for example, U.S. Pat. No. 4,644,538 (Cooper et al.) that describes a general autopilot system, and U.S. Pat. No. 5,868,659 (Cartmell et al.) that describes an autopilot system for use with a fly-by-wire aircraft control system.

During flight, passenger airliners frequently fly on autopilot. While it is possible for access to such autopilot systems to be protected by passwords etc., to avoid unauthorised access such security has its limitations. Threats can persuade pilots to unlock such systems, and ultimately the aircraft normally needs to return to manual control before landing.

There is also an urgent need to protect designated man-made structures and sites that are thought likely to be attractive targets for pilots who wish to deliberately crash an aircraft. For example; such sites may be buildings in which thousands of people work; sites of national and international importance, such key economic and historic buildings; military and governmental installations; and hazardous processing or production sites. Such sites can be protected by surface to air missile (SAM) systems but such systems present great potential danger, especially to aircraft passengers. Further, stationing SAM systems at all such sites is costly and impractical and, indeed, represents a potential additional security threat. There are also situations where such systems may not be able operate sufficiently quickly, even if activated automatically; for example, where a legitimate flight path passes close to a potential target; especially during aircraft approach to or departure from a civil airport. In such cases deviation from the correct flight-path for just a few seconds may be sufficient to result in a catastrophic collision.

BRIEF SUMMARY OF THE INVENTION

An aim of the present invention is to provide an aircraft control system that prevents flight of an aircraft into excluded airspace, irrespective of any on board pilot commands. Another aim is to provide an aircraft control system that offers increased security against the aircraft being flown in an unauthorised manner.

According to a first embodiment of the invention there is provided a flight control system for an aircraft, comprising means for determining the geographical position of the aircraft and means for comparing it with pre-determined geographical boundaries and control means designed to override a normal control system accessible to a pilot to alter the course of the aircraft irrespective of any pilot commands.

The control system of the invention can take control of an aircraft in the event of it being commandeered. The geographical boundary may be an open border or closed border. A closed border, (or indeed its airspace) may extend upwardly from a pre-determined ground area by a specified distance and thereby define an excluded volume of airspace.

According to a second embodiment of the invention there is provided a flight control system for an aircraft comprising an on-board GPS that continually determines the geographical location of the aircraft and comparator means within the aircraft that compare this location with pre-determined excluded geographical locations that represent excluded zones; said comparator means, when appropriate, activating control means to prevent the aircraft being piloted within said excluded zones.

The control system of the invention can take control of an aircraft in the event of it being commandeered, and can prevent the aircraft entering pre-determined geographical boundaries, which take the form of excluded zone(s). An excluded zone may typically be defined to protect buildings in which thousands of people work; sites of national and international importance, such as military and governmental installations; hazardous processing or production sites; and key economic and historic buildings. Many excluded zones may be pre-determined for key potential targets in a wide variety of international locations. The location of pre-determined zones may be stored electronically using software, and appropriate hardware, most preferably in encrypted format.

According to a third embodiment of the invention there is provided a flight control system for an aircraft having an on-board GPS that continually determines the geographical location of the aircraft comprising comparator means within the aircraft that compare said determined location with pre-determined excluded geographical locations that represent excluded zones; said comparator means, when appropriate, activating control means to prevent the aircraft being piloted within said excluded zones.

BRIEF DESCRIPTION OF DRAWINGS

Embodiments of the invention will now be described, by way of example only, and with reference to the following schematic diagrams in which.

DETAILED DESCRIPTION OF THE INVENTION

Figure 1:
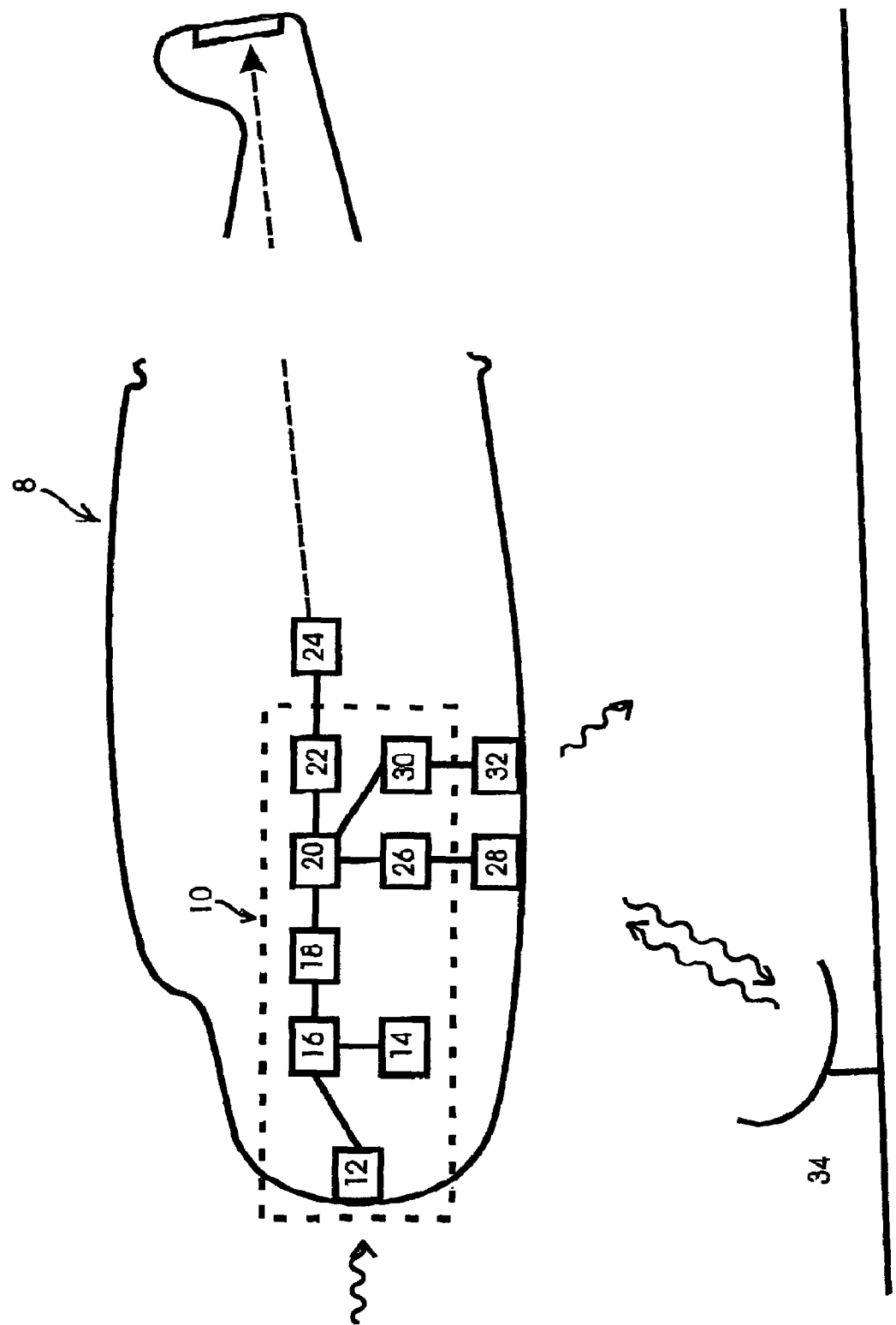
FIG. 1 shows the major subsystems for a preferred embodiment of the invention.

A first embodiment of the invention will now be described. Referring to FIG. 1, an aircraft 8 such as a civil aircraft with an autopilot 24 has a control system according to the invention 10, comprising the following subsystems; a GPS 12 (or the like), means for storing predetermined geographical locations 14, comparator means 16, revised flight path calculator means 18, verifier 20, and interface facility 22.

The predetermined geographical locations may be stored in digital format on hard disc or the like; for example, by reference to the latitude, longitude and height; the locations corresponding to the volume of space occupied by each of man-made structures intended for protection. A boundary may be defined around buildings (see FIG. 2). While many man-made structures can be mapped by such means the system of the invention offers the advantage that data is not required in respect of natural topographic features over which the aircraft may fly. Thus, the data storage requirements are considerably reduced. Comparator 16 comprises a digital processor capable of running a computer program or the like that follows pre-determined logic. Revised flight path calculators 18 are well known to persons skilled in the art of aircraft control system design; for example, such systems have been published in U.S. Pat. No. 5,488,563 (Chazelle et al.). Verifier 20 serves two functions; firstly to interface via interface facility 22 with the aircraft autopilot 24 and secondly to perform pre-determined verification checks before triggering the system. Preferably, verification involves confirmation that one or more parallel systems (12,14,16 and 18) have also been triggered. If necessary, the system of the invention can be triggered within a fraction of a second of a threatening deviation in flight path. Hence, the system can be used by aircraft where the takeoff or landing flight paths lie very close to structures requiring protection.

Optionally, there is provided a two way transceiver 28 that allows communication between ground control 34 and verifier 20 via second interface means 26. Also a warning beacon 32 is optionally activated by verifier 20 via third interface means 30. Optionally, control system 10 may receive data from an altimeter (not shown) or the GPS may be used to determine altitude.

In use, the GPS 12 continually sends geographical position data to comparator 16. Comparator 16 has access to data defining pre-determined geographical locations 14. Optionally, the comparator 16 may also receive data from an altimeter; for example the GPS may be used to determine altitude. From real time position data, the comparator 16 calculates ground speed and flight direction and on the assumption that the aircraft will continue on its present course triggers an intervention signal when it is within a predetermined distance or (minimum) time from reaching a boundary of or entering a pre-determined geographical location. At roughly (or precisely) the same time a flight path that will avert the pre-determined geographical location is calculated by revised flight path calculator 18. These data are stored, for example in the revised flight path calculator 18 or the verifier 20. Verifier 20 switches control of the aircraft from on board pilots to an autopilot using the system of the invention. Verifier 20 preferably prevents control of the aircraft being taken from on board pilots unless specified verification check(s) have been made. This will typically comprise confirmation that one or more parallel systems have also been triggered. For example; the aircraft may have several systems according to the invention working in parallel in order to avoid false interventions. Furthermore, the aircraft may be fitted with a "dummy" system to prevent tampering by saboteurs or others. Interface 22 allows a flight path that averts the excluded zone to be communicated to an autopilot 24 or similar device that controls the flight speed/path of the aircraft. Autopilot 24 is provided with means to prevent on board pilot control in the event of an intervention signal being verified. Optionally, once so triggered the system may use warning beacon 32 to transmit a signal to (the ground and/or) other aircraft in its vicinity so that pilots of such aircraft are aware the aircraft was no longer tinder pilot control. Optionally, the system may also includes a two way transmitter and receiver 28 that allows source encrypted communication with a government or security agency or ground control 34. This option allows ground facility 34 to transmit an encrypted signal to the aircraft 28 that passes to verifier 20 via second interface 26 and thereby either returns control to on board pilots or alternatively allows the ground facility 34 to directly control or set the autopilot 24 such that the aircraft is partly or fully under the control of ground based authorities.

A second embodiment of the invention will now be described. An aircraft 8 such as a civil aircraft with an autopilot 24 has a control system according to the invention 10, comprising the following subsystems; a GPS 12 (or the like), means for storing excluded zone data 14, comparator means 16, revised flight path calculator means 18, verifier 20, and interface facility 22.

In use, the GPS 12 continually sends geographical position data to comparator 16. Comparator 16 has access to data defining excluded zones 14. From real time GPS data the comparator 16 calculates ground speed, flight direction and altitude and on the assumption that the aircraft will continue on its present course triggers an intervention signal when the aircraft is within a predetermined distance or (minimum) time from reaching the boundary of or of entering an excluded zone. At (roughly or) precisely the same time a flight path that will avert the excluded zone is calculated. These data are stored, for example in the comparator 18 or the verifier 20. Verifier 20 switches control of the aircraft from on board pilots to the system of the invention. Verifier 20 also prevents control of the aircraft being taken from on board pilots unless specified verification check(s) have been made. In all respects other than the use of excluded zones, this second embodiment is substantially the same as the first embodiment.

Figure 2:
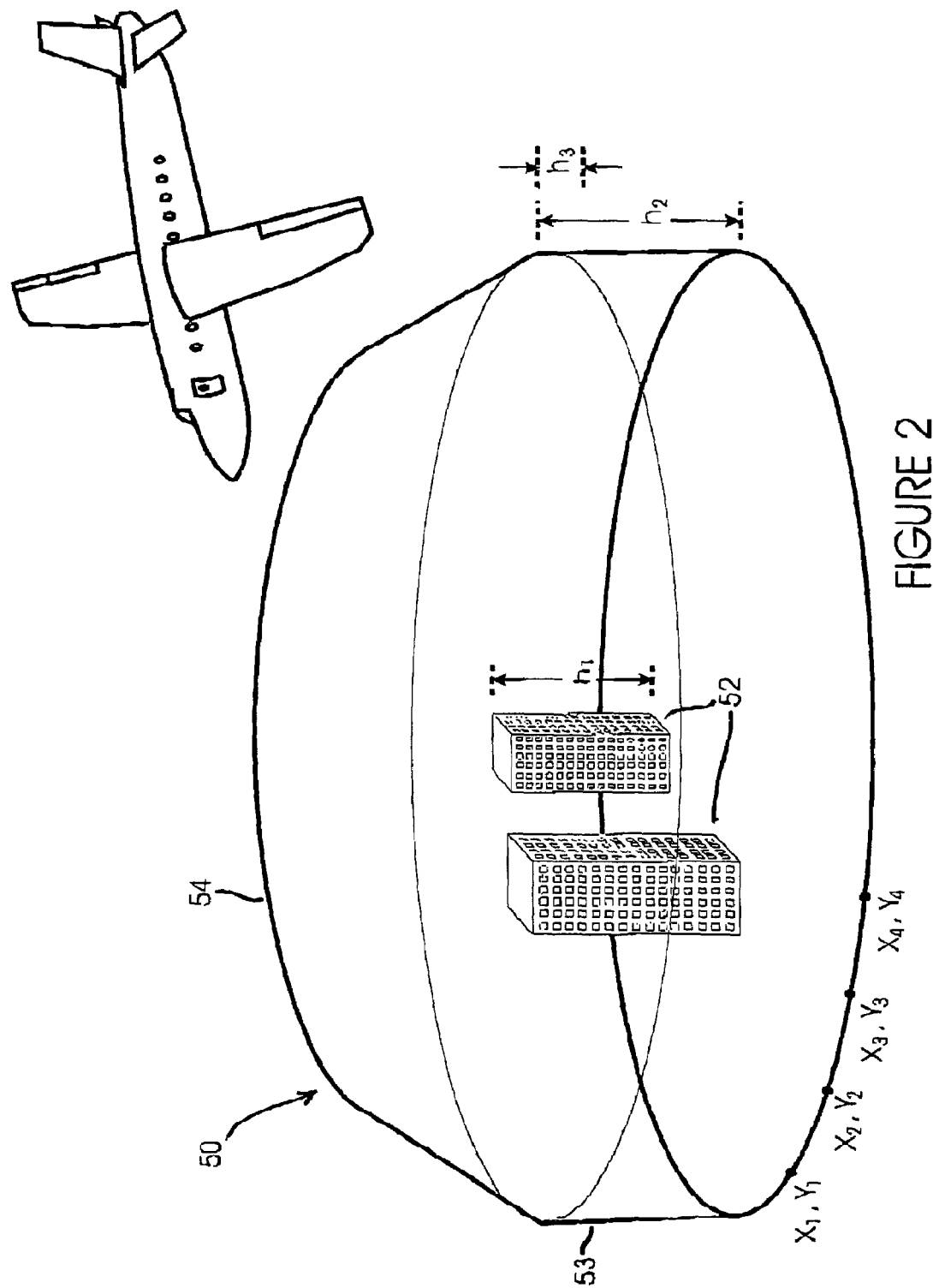
FIG. 2 shows an aircraft fitted with the invention avoiding an excluded zone, and the use of polar coordinates to determine excluded air space.

A boundary such as an excluded zone 50 may be defined around buildings 52 (see FIG. 2). Excluded zone 50 can be defined in a way that is independent of the height of the aircraft above ground level. This can offer the advantage of preventing bypassing of the system of the invention by tampering with altimeters or associated equipment that determines the height of the aircraft above ground level. In this case, excluded zones 50 may comprise a boundary such as a "wall" 53 which will correspond to a matrix of geographical grid co-ordinates $(X_1, Y_1; X_2, Y_2; X_3, Y_3; X_4, Y_4 \ldots X_n, Y_n)$ that define an excluded area of land (or sea) at ground level and thereby prevent flight in all of the airspace vertically above this excluded area. It will be appreciated that the boundary does not have to be closed. It could be in the form of a border line.

Additionally and/or alternatively, the excluded zones may also be defined to allow the aircraft entering airspace a pre-determined height above sea level, by defining a "roof" 54 to the excluded zone 50. This may correspond the airspace extending a pre-specified height above an excluded area of land. That allows non dangerous aircraft to continue flying on a non dangerous path without changing course.

The excluded zone may also be defined by a matrix of three dimensional; co-ordinates; for example, Cartesian co-ordinates that define a non planar boundary between permitted and excluded air space. This boundary may be defined at least in part by polar co-ordinates combined with fixed reference points, for example, points on buildings or at fixed distances above buildings (see FIG. 2). This more complex definition of excluded air space may allow the aircraft flight control system to avoid entry within the excluded zone with a less drastic flight manoeuvre.

The control system may define an excluded zone extending substantially vertically to a height $h_2$ equal to the height of the tallest building structure or the like $h_1$ (in FIG. 2), in the excluded zone, plus a height $h_3$; where $h_3$ may be the maximum vertical distance attainable in a maximum angle controlled dive towards the zone. The size of the excluded zone may be determined by calculating a boundary for the excluded zone that is dependent upon the approach speed of the aircraft. For example; the boundary of an excluded zone may be larger (e.g. the roof may be higher) if an aircraft approaches it at a high dive speed and relatively smaller (e.g. the roof may be lower) if an aircraft approaches it at a low speed. The distance between excluded zone boundary and a protected building etc., may be such as to allow avoidance if an aircraft enters the zone and is auto lifted/swerved at maximum capability.

The control system of the invention takes averting action to avoid an excluded zone based on position, air ground speed and flight direction data measured by a GPS, or the like. Thus, by continually monitoring ground speed and direction data and company this with any excluded zone falling in the near term flight path of the aircraft the system overrides pilot commands and takes action to avoid the excluded zone well before approaching an excluded zone. This may allow the aircraft to gradually change course, which is preferable to a sudden change in course and also offers the possible advantage of not being immediately detected by an unauthorised pilot. Of course, in certain situations, maximum aircraft movement may be required; for example, where the legitimate flight path of the aircraft closely approaches an excluded zone.

A third embodiment of the invention will now be described. An aircraft 8 such as a civil aircraft with a GPS 12 (or the like), and an autopilot 24 has a control system according to the invention comprising the following subsystems; means for storing excluded zone data 14, comparator means 16, revised flight path calculator 18, verifier 20, and an interface facility 22.

In a further aspect of the above described embodiments of the invention, following control action to avoid an excluded zone or boundary the plane would continue to be flown by autopilot to a pre-determined location. The location may be a "safe" airport; for example, a nearby military air base (which is better equipped to deal with saboteurs). In such circumstances the control system of the invention optionally activates systems within the aircraft to dump excess fuel prior to landing, again depriving on-board pilots the ability to override this action.

In another aspect of the invention, a facility is provided for a ground based Government or security agency 34 transmits an encrypted signal via a transceiver 28 and second interface means 26 that unlocks the control system of the invention and returns control to a pilot on board the aircraft.

In a further aspect of the invention, there is provided a control system for an aircraft, comprising means for detecting an imminent crash situation, and means for releasing fuel from fuel supply and from aircraft in response. Predetermined land areas such as green-field sites are programmed as safe to eject fuel in a foreseeable yet unavoidable aircraft failure situation. Fuel ejection can reduce the severity of a crash induced explosion or eliminate explosion altogether. Fuel ejection may be dependent on aircraft height, in that above a certain height fuel will almost completely disperse before hitting ground/building level.

The control system may have means to monitor orientation of aircraft and act where orientation is excessive and/or suspicious (e.g. a very steep dive). The control system may have a means for preventing aircraft entering a dive of more than a certain angle; e.g. 45°, from a location above or adjacent to an excluded zone. This may only be practical where the excluded zone is relatively small to allow successful alteration of course of aircraft if it does try to dive into an excluded zone. In contrast, larger excluded zones would not be avoidable if the aircraft dived (almost vertically) into the middle of an excluded zone.

Civil aircraft often stick closely to known routes between two locations such as cities. In a further aspect of the invention the control system may have a pre-programmed flight path between certain locations, and the flight path has a border around it (to allow for some deviation during flight; e.g. emergency landing) and means for preventing aircraft leaving a zone confined by such a border. A warning to other aircraft and/or ground may be given by a known warning device (e.g. a homing beacon) to proclaim that the aircraft is approaching/or has approached such a border zone.

According to another aspect of the invention, the aircraft control system has detection means which detects at which, longitude the aircraft flies through a certain latitude, and is designed to apply correcting means to alter the flight path if the said latitude approaches a specified allowable boundary longitude(s).

According to another aspect of the invention, the aircraft control system has detection means which detects at which, latitude the aircraft flies through a certain longitude, and is designed to apply correcting means to alter the flight path if the said longitude approaches a specified allowable boundary latitude(s).

The system of the invention is particularly suited for use in aircraft having fly-by-wire control systems wherein most or all aircraft control systems are under computer control.

We claim:

1. A flight control system for an aircraft comprising means for continually determining the geographical position of the aircraft and processing means within the aircraft that compare the geographical position of the aircraft with predetermined excluded geographical locations that represent excluded zones; said excluded zones being defined around man-made structure; said processing means, when appropriate, activating control means to prevent the aircraft being piloted within said excluded zones.

2. A flight control system according to claim 1 wherein excluded zone avoidance can be triggered within a fraction of a second of a threatening deviation in flight path thereby allowing the system to be used by aircraft where the takeoff or landing flight paths lie very close to structures requiring protection.

3. A flight system according to claim 1 wherein using real time position data, a comparator calculates ground speed and flight direction and on the assumption that the aircraft will continue on its present course triggers zone avoidance when the aircraft is within a predetermined distance or within a minimum time from reaching the boundary of an excluded zone.

4. A flight system according to claim 1 wherein a ground facility may transmit an encrypted signal to the aircraft that passes to a verifier via an interface and thereby returns control to an onboard pilot or alternatively allows the wound facility to directly control or set an auto-pilot such that the aircraft is partly or fully under the control of ground based authorities.

5. A flight control system according to claim 1 that is re-set to allow pilot control following receipt an encrypted command transmitted by a government agency.

6. A flight control system according to claim 1 which takes averting action to avoid the excluded zone based on flight direction and ground velocity data measured by aircraft equipment.

7. A flight system according to claim 1 wherein the excluded zone are defined by polar co-ordinates combined with fixed reference points, the fixed reference points corresponding to points on man made structures or at fixed distances above man made structures.

8. A flight control system according to claim 1 comprising means for ensuring tat the aircraft lands at the nearest secure airport; irrespective of any pilot commands, subsequent to activation of the system to avoid an excluded zone.

9. A flight control system according to claim 1 wherein following activation of the system to avoid an excluded zone the flight control system propagates a warning signal to alert other aircraft in its vicinity that the aircraft having the said flight control system is no longer under pilot control.

10. A flight control system according to claim 1 wherein following averting action to avoid an excluded zone all vital aircraft functions are subsequently controlled by commands transmitted from the ground by a government agency.

11. A flight system according to claim 1 which switches control of the aircraft from on board pilots to the system of the invention when specified verification checks have been made including confirmation that one or more parallel systems have also been triggered.

12. A flight control system for preventing an aircraft colliding with designated man-made structures, comprising; means for determining the geographical position of the aircraft; means for storing excluded zone data relating to excluded zones, said excluded zones being defined as space around man-made structures to be protected; comparator means for comparing said determined geographical position of the aircraft with said excluded zones; revised flight path calculator means that calculates a flight path that avoids said excluded zones when the aircraft is proximal and approaching an excluded zone; and an interface facility that alters the course of the aircraft to the said flight path that avoids said excluded zones, irrespective of any pilot commands.

13. A flight control system according to claim 12 wherein the control system takes averting action to avoid an excluded zone before entering the proximity of that excluded zone, in such a way as not to be immediately detected by an unauthorised pilot.

14. A flight control system according to claim 12 wherein the normal flight control system is a fly-by-wire control system.

15. A flight system according to claim 12 wherein the size of the excluded zone is determined by calculating a boundary for the excluded zone that is dependent upon the approach speed of the aircraft so that the boundary of the excluded zone is larger if an aircraft approaches the zone at a high speed than if an aircraft approaches the zone at a low speed.

16. A flight control system for an aircraft comprising means for determining the position of the aircraft and means for comparing said position with predetermined excluded zones, said excluded zones being defined as space around man-made structures to be protected; said excluded zones falling in the near term flight path of the aircraft, and control means to prevent the aircraft being piloted within said excluded zones, wherein the system takes action to avoid an excluded zone before entering the proximity of that excluded zone, in such a way as not to be immediately detected by a pilot.

17. A flight system according to claim 16 wherein an excluded zone is defined round a man made structure so that the zone comprises a "wall".

* * * * *